Sept. 13, 1955     L. L. BENNETT     2,717,725
HAND GARDEN SEEDER
Filed May 8, 1953
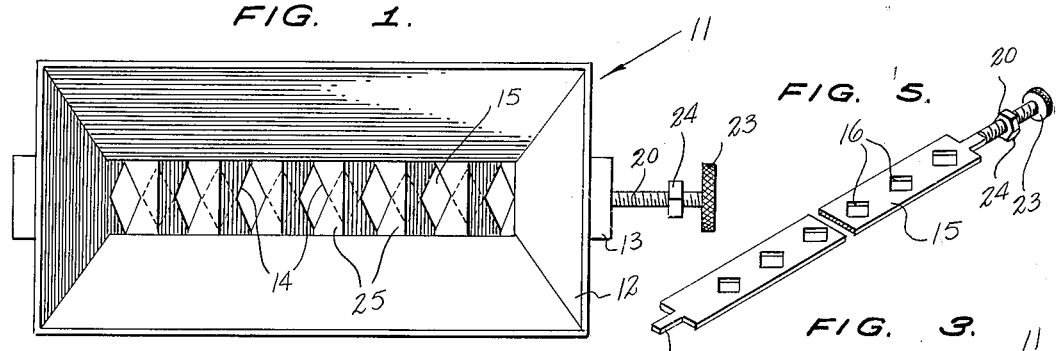
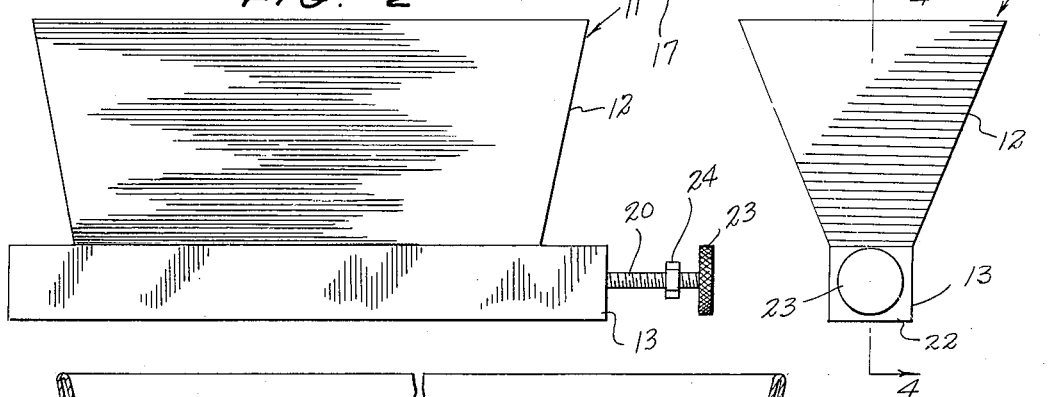
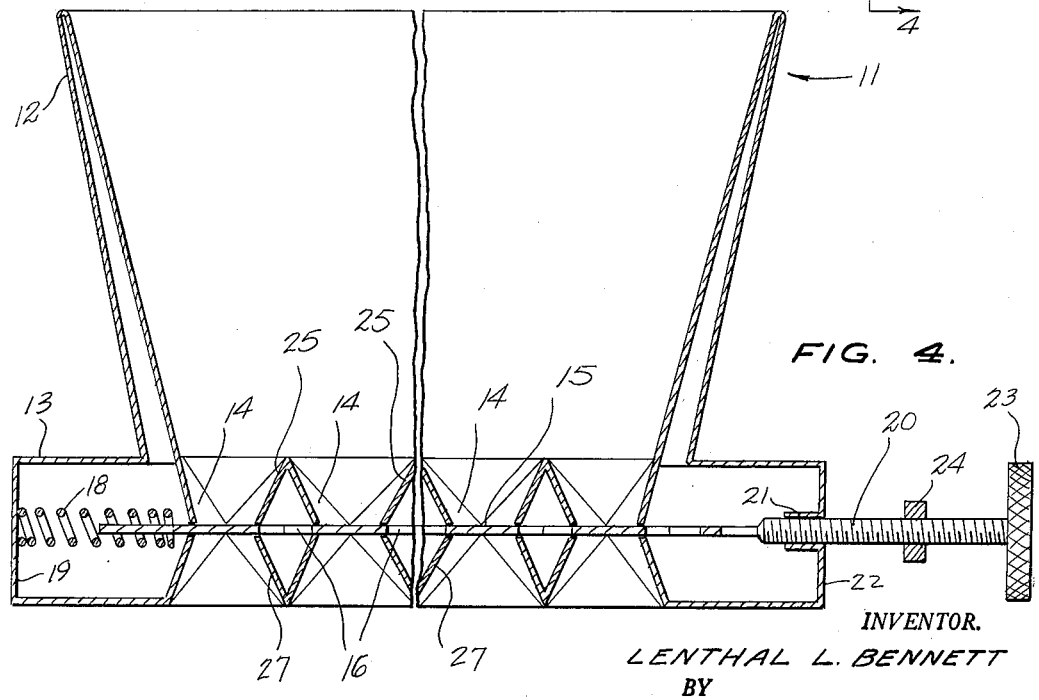
INVENTOR.
LENTHAL L. BENNETT
BY McMorrow, Berman & Davidson
ATTORNEYS

United States Patent Office 2,717,725
Patented Sept. 13, 1955

2,717,725
HAND GARDEN SEEDER
Lenthal L. Bennett, Ashland, Oreg.

Application May 8, 1953, Serial No. 353,873

2 Claims. (Cl. 222—485)

This invention relates to portable seeders, and more particularly to an improved hand operated garden seeder.

A main object of the invention is to provide a novel and improved portable garden seeder which is simple in construction, which is easy to operate, and which is compact in size.

A further object of the invention is to provide an improved hand-operated portable garden seeder which is inexpensive to manufacture, which is durable in construction, and which enables the user to meter out a desired amount of seed by a simple manual operation of the control element of the seeder, thereby achieving economical distribution of the seeds, even spreading of the seeds in rows and eliminating the necessity of thinning the plants after they have commenced growth.

Further objects and advantages of the invention will become apparent from the following description and claims, and from the accompanying drawings, wherein:

Figure 1 is a top view of an improved hand garden seeder constructed in accordance with the present invention.

Figure 2 is a side elevational view of the seeder of Figure 1.

Figure 3 is an end elevational view of the seeder shown in Figures 1 and 2.

Figure 4 is an enlarged vertical longitudinal cross sectional view taken through the seeder on the line 4—4 of Figure 3.

Figure 5 is a fragmentary perspective view of the valve plate element employed in the seeder illustrated in Figures 1 to 4.

Referring to the drawings, the seeder is designated generally at 11 and comprises a seed hopper 12 which may be generally rectangular in plan and which is formed at its bottom end with the rectangular housing 13, said housing being formed with the longitudinally aligned, evenly spaced, diamond-shaped discharge apertures or passages 14, said apertures flaring upwardly at their upper portions and flaring downwardly at their lower portions, as is clearly shown in Figure 4.

Designated at 15 is a flat elongated valve plate which is slidably mounted in the housing 13 beneath the upper portions of the apertures 14, as shown in Figure 4, the plate 15 being formed with the longitudinally aligned diamond-shaped openings 16 which are spaced evenly in the same manner as the discharge openings 14 and which are therefore at times registrable with the discharge openings 14. The valve plate 15 is slidably supported for longitudinal reciprocation in the housing 13 and is formed at one end with the reduced lug portion 17. Engaged on the lug portion 17 is a coiled spring 18 which bears between the plate 15 and the end wall 19 of housing 13, biasing the plate to the right, as viewed in Figure 4, namely, to a position wherein the apertures 16 of the plate are disposed between adjacent discharge apertures 14, whereby the bottom of the hopper 12 is closed off.

Secured to the opposite end of the valve plate 15 is the longitudinally extending, axially arranged threaded rod 20 which is slidably supported in a sleeve element 21 integrally formed in the right end wall 22 of housing 13. The threaded rod 20 is provided at its outer end with the knob 23 and said threaded rod is further provided with the stop nut 24 threadedly engaged on the rod and serving to limit inward movement of the rod to a position wherein the apertures 16 of the plate member 15 will be moved into registry with the discharge apertures 14 when the knob 23 is pushed inwardly. The nut 24 may be adjusted on the rod 20 so that when the knob 23 is pushed inwardly, the nut 24 will abut the end wall 22 of the discharge aperture housing 13 when the discharge apertures 16 are moved into registry with the apertures 14.

As shown in Figure 4, the bottom wall of the hopper 12 is formed between the discharge apertures 14 with the upwardly tapering hollow ribs 25, said ribs extending transversely across the bottom of the hopper 12 between the successive discharge apertures 14. The bottom wall of the discharge housing 13 is formed below the ribs 25 with the opposed, downwardly tapering hollow ribs 27 which define downwardly flaring discharge nozzles below the apertures 14.

The transversely extending upwardly tapering hollow ribs 25 serve to guide the seeds downwardly through the discharge openings and also serve to prevent clogging of the discharge openings by masses of seeds.

In using the device the hopper 12 receives the seeds to be distributed, and the user discharges seeds in the required rows or locations by moving the knob 23 inwardly until the nut 24 comes into abutment with the end wall 22 of the discharge valve housing 13 of the seeder. Thus, the desired amount of seeds are metered out by a simple manual actuation of the knob 23, whereby the seeds are dispensed in evenly spaced rows and in an economical manner.

It will be readily apparent that the degree of registration of the apertures 14 and the apertures 16 may be regulated by adjusting the position of the nut 24 on the threaded rod member 20. Thus, the nut may be adjusted so that when the knob 23 is moved inwardly to a position wherein the nut 24 abuts the housing end wall 22, the apertures 16 of the valve plate 15 will only be in partial registry with the discharge apertures 14 of hopper 12, whereby discharge of the seeds from the hopper will occur at a limited rate. The degree of registration may be regulated in accordance with the size of the seeds and the desired density of seed distribution.

While a specific embodiment of an improved garden seeder has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A hand garden seeder comprising a seed hopper having a bottom discharge housing formed with a plurality of aligned, evenly spaced, substantially diamond-shaped discharge apertures, a valve plate, means slidably supporting said plate in said discharge housing, said plate being formed with aligned spaced substantially diamond-shaped apertures registrable with said first-named apertures, spring means engaged between one end of said discharge housing and one end portion of said plate and biasing said plate toward a closing position with respect to said first-named apertures, a manually engageable threaded actuating member secured to the other end of said plate and projecting slidably through the other end of said discharge housing, and an adjustable stop member threadedly engaged on said actuating member and cooperating with said other end of the discharge housing to limit registration of the apertures of the plate and the apertures of the discharge housing.

2. A hand garden seeder comprising a seed hopper having a bottom discharge housing formed with a plurality of spaced discharge apertures, a valve plate, means slidably supporting said plate in said discharge housing, said plate being formed with spaced apertures registerable with said first-named apertures, spring means engaged between one end of said discharge housing and one end portion of said plate and biasing said plate toward a closing position with respect to said first-named apertures, a manually engageable threaded actuating member secured to the other end of said plate and projecting slidably through the other end of said discharge housing, and an adjustable stop member threadedly engaged on said actuating member and cooperating with said other end of the discharge housing to limit registration of the apertures of the plate and the apertures of the discharge housing.

References Cited in the file of this patent

UNITED STATES PATENTS

| | | |
|---|---|---|
| 9,373 | Trevitt | Nov. 2, 1852 |
| 484,630 | Crane | Oct. 18, 1892 |
| 839,131 | Gould | Dec. 25, 1906 |
| 1,274,855 | Chesbrough | Aug. 6, 1918 |
| 1,553,113 | Rutt | Sept. 8, 1925 |
| 1,904,756 | Wooster | Apr. 18, 1933 |
| 2,496,728 | Laubhan | Feb. 7, 1950 |
| 2,634,029 | Juzwiak | Apr. 7, 1953 |